(12) United States Patent
Giengiel et al.

(10) Patent No.: US 11,480,152 B2
(45) Date of Patent: Oct. 25, 2022

(54) ROTOR ARRESTING DEVICE FOR A WIND TURBINE AND METHOD

(71) Applicant: Wobben Properties GmbH, Aurich (DE)

(72) Inventors: Wojciech Giengiel, Aurich (DE); Jochen Röer, Ganderkesee (DE)

(73) Assignee: Wobben Properties GmbH, Aurich (DE)

( * ) Notice: Subject to any disclaimer, the term of this patent is extended or adjusted under 35 U.S.C. 154(b) by 135 days.

(21) Appl. No.: 16/468,640

(22) PCT Filed: Nov. 27, 2017

(86) PCT No.: PCT/EP2017/080530
§ 371 (c)(1),
(2) Date: Jun. 11, 2019

(87) PCT Pub. No.: WO2018/108506
PCT Pub. Date: Jun. 21, 2018

(65) Prior Publication Data
US 2020/0088163 A1    Mar. 19, 2020

(30) Foreign Application Priority Data
Dec. 14, 2016  (DE) ...................... 10 2016 124 379.5

(51) Int. Cl.
*F03D 7/02*   (2006.01)
*F03D 13/00*  (2016.01)
(Continued)

(52) U.S. Cl.
CPC ............ *F03D 7/0264* (2013.01); *F03D 13/00* (2016.05); *F03D 80/00* (2016.05); *F03D 80/50* (2016.05);
(Continued)

(58) Field of Classification Search
CPC ........ F03D 7/0264; F03D 80/00; F03D 80/50; F03D 7/0268; F05B 2230/608;
(Continued)

(56) References Cited

U.S. PATENT DOCUMENTS

| 8,624,412 B2 | 1/2014 | Siegfriedsen |
| 8,647,060 B2 | 2/2014 | Yoshida |

(Continued)

FOREIGN PATENT DOCUMENTS

| CN | 102725521 A | 10/2012 |
| CN | 204283953 U | 4/2015 |

(Continued)

*Primary Examiner* — Christopher Verdier
(74) *Attorney, Agent, or Firm* — Seed Intellectual Property Law Group LLP

(57) ABSTRACT

A rotor arresting device, a wind turbine and a method for arresting and/or rotating a rotor. The rotor arresting device comprises a rotor, a rotational assembly, and a static assembly fixed in position, comprising a toothed disk, which can be arranged on the rotational assembly, having a plurality of arresting recesses arranged along a circumference, wherein two adjacent arresting recesses form a tooth, a first arresting module having at least one first arresting element, a second arresting module having at least one second arresting element, wherein the first and the second arresting module can be arranged on the static assembly, wherein the first and the second arresting element are arranged and designed to engage in arresting recesses of the toothed disk, wherein the spacing of the first arresting element from the second arresting element in the circumferential direction of the toothed disk is a non-integral multiple of a tooth tip spacing of the toothed disk.

17 Claims, 14 Drawing Sheets

(51) Int. Cl.
*F03D 80/50* (2016.01)
*F03D 80/00* (2016.01)

(52) U.S. Cl.
CPC ..... *F05B 2230/608* (2013.01); *F05B 2230/70* (2013.01); *F05B 2230/80* (2013.01); *F05B 2260/31* (2020.08); *F05B 2270/326* (2013.01)

(58) Field of Classification Search
CPC .............. F05B 2230/70; F05B 2230/80; F05B 2260/30; F05B 2260/31; F05B 2270/326
See application file for complete search history.

(56) References Cited

U.S. PATENT DOCUMENTS

| | | | |
|---|---|---|---|
| 9,194,374 | B2 | 11/2015 | Valero Lafuente |
| 2008/0181761 | A1 | 7/2008 | Moore et al. |
| 2012/0266708 | A1 | 10/2012 | Valero Lafuente |
| 2013/0076040 | A1 | 3/2013 | Tsutsumi |
| 2014/0133983 | A1* | 5/2014 | Canedo Pardo ...... F03D 7/0268 416/9 |
| 2015/0147211 | A1* | 5/2015 | Czerwonka ............. F04C 2/088 418/1 |
| 2015/0204308 | A1 | 7/2015 | Jensen et al. |
| 2015/0260164 | A1 | 9/2015 | Su |
| 2020/0332772 | A1* | 10/2020 | Therkildsen ............ F03D 15/00 |

FOREIGN PATENT DOCUMENTS

| | | |
|---|---|---|
| CN | 105386941 A | 3/2016 |
| DE | 10031472 C1 | 4/2002 |
| DE | 102008054100 A1 | 5/2010 |
| DE | 102008063043 B4 | 10/2010 |
| DE | 212013000242 U1 | 7/2015 |
| EP | 1167754 A2 | 1/2002 |
| EP | 2495435 A1 | 9/2012 |
| EP | 2927479 A1 | 10/2015 |
| EP | 2821636 B1 | 9/2017 |
| JP | 2011256749 A | 12/2011 |
| JP | 2015215009 A | 12/2015 |
| KR | 20130069720 A | 6/2013 |
| RU | 2031240 C1 | 3/1995 |
| WO | 2013/042252 A1 | 3/2013 |
| WO | 2014097433 A1 | 6/2014 |

* cited by examiner

ROTOR ARRESTING DEVICE FOR A WIND TURBINE AND METHOD

BACKGROUND

Technical Field

The invention relates to a rotor arresting device for a wind turbine, to a wind turbine and to a method for arresting and/or rotating a rotor of a wind turbine.

Description of the Related Art

A wind turbine converts the energy of the wind into electric energy. The dominant design of wind turbines is the three-blade horizontal-axis wind turbine in which the rotor is on the windward side during operation and the equipment pod thereof is arranged on a tower and the wind direction is actively tracked.

The aerodynamic rotor of the wind turbine preferably comprises one, two or more rotor blades, which are preferably secured on a common hub. This hub is furthermore preferably connected in a torsionally rigid manner to a rotational assembly. In the case of wind turbines with a direct drive, i.e., without a transmission for conversion, the rotor drives a generator rotor via the hub and a journal, for example. In the case of wind turbines with a transmission, the rotational assembly furthermore generally comprises a rotor shaft, which connects the rotor and a transmission to one another. Thus, the rotary motion of the rotor is converted by the transmission into a transmission output motion, thus enabling this transmission output motion then to be transmitted in turn to a generator.

In the sense according to this application, a rotor is taken to mean the aerodynamic rotor of a wind turbine, generally having three rotor blades. In the sense according to this application, a generator rotor is taken to mean an electrodynamic rotor of a generator, preferably of a generator for a wind turbine. A generator in the sense according to this application comprises both internal-rotor generators, in which a generator rotor rotates radially within a stator, and external-rotor generators, in which a generator rotor rotates radially on the outside around a stator. The aerodynamic rotor of a wind turbine has to be arrested in various situations, and it is furthermore preferred if the rotor is arrested in one specific rotational position.

For example, it may be necessary for the rotor to be arrested in order to carry out repair and/or maintenance work, e.g., within the nacelle or in the region of the hub. It may furthermore be necessary to arrest the rotor as soon as the wind turbine is assembled and/or disassembled. For example, high arresting forces and/or arresting moments to hold a rotor in a defined position arise if not all the rotor blades envisaged are arranged and the rotor is thus in an unstable position. This is necessary especially in the advantageous "six o'clock position", in which a hub connection region on which no rotor blade is arranged is pointing in the direction of the foundation of the wind turbine and the longitudinal axes of two other rotor blades which have preferably already been mounted are pointing partially in an opposite direction. As a result, the rotor blades, which are arranged nonuniformly around an axis of rotation, cause a high torque in relation to this axis of rotation.

As soon as the prevailing wind speed exceeds the maximum wind speed for the wind turbine, it may furthermore be advantageous not only to change the angle of attack of the rotor blades in order to brake the rotor but also to halt the rotor of the wind turbine, i.e., to brake it to a speed of zero, and then to arrest it in such a way that the rotor is prevented from rotating. It is furthermore often necessary for the rotor to be arrested with a high precision in a desired position, thus enabling position-dependent repairs and/or maintenance work and/or assembly work to be carried out.

Rotor arresting devices known in the prior art have the object, in particular, of providing reliable arresting. This can be explained especially by the fact that provision has to be made, through appropriate safety measures, for people working on the wind turbine. In the case of rotor arresting devices known in the prior art, it is primarily combinations of bolts and, preferably, a number of openings which are therefore provided. As a further preference, openings are arranged in a generator rotor of a generator, in particular in a rotor support, the direction of passage through said openings preferably being arranged substantially parallel to an axis of rotation of the generator. Bolts, which preferably correspond to the openings and which can be arranged in the openings, are arranged on the generator stator, in particular on a stator support. Arresting of the generator rotor and thus also of the aerodynamic rotor can be achieved by arranging the bolts within the openings.

Although a rotor arresting device cited and described above can, on the one hand, provide reliable arresting of the rotor, it is only possible to position the rotor at positions in which openings are provided in the rotational assembly. To install rotor blades, for example, it is furthermore necessary, after installing a first rotor blade, to release the arresting in order to rotate the rotor into the position for the installation of the second rotor blade, preferably into a six o'clock position, and to arrest it there once again. In a very wide range of areas of application, this results in high costs and a large amount of effort. Although the existing systems and methods for arresting wind turbine rotors offer various advantages, further improvements are desirable.

At the priority application stage of the present application, the German Patent and Trademark Office found the following prior art: DE 100 31 472 C1, DE 10 2008 063 043 B4, DE 10 2008 054 100 A1 and DE 21 2013 000 242 U1.

BRIEF SUMMARY

It is therefore an object of the present invention to provide a solution which mitigates or eliminates one or more of the disadvantages cited. It is furthermore an object of the present invention to provide a solution which allows lower-cost and/or simpler assembly and/or maintenance and/or repair of a wind turbine. Moreover, it is an object of the present invention to provide a solution which improves and/or simplifies the arresting of a wind turbine.

According to a first aspect of the present invention, the object stated at the outset is achieved by a rotor arresting device for a wind turbine having a rotor, a rotational assembly connected in a torsionally rigid manner to the rotor, and a static assembly fixed in position relative to the rotational assembly, comprising a toothed disk, which can be arranged on the rotational assembly, having a plurality of arresting recesses arranged along a circumference, wherein two adjacent arresting recesses form a tooth, a first arresting module having at least one first arresting element, a second arresting module having at least one second arresting element, wherein the first arresting module and the second arresting module can be arranged on the static assembly, wherein the first arresting element and the second arresting element are arranged and designed to engage in arresting recesses of the toothed disk, wherein the spacing of the at least one first arresting element from the at least one second arresting element in the circumferential direction of the toothed disk is a non-integral multiple of a tooth tip spacing of the toothed disk.

The rotational assembly is connected in a torsionally rigid manner to the rotor. Unless described explicitly otherwise, a rotor should be taken to mean the assembly comprising at least one rotor blade and a hub on which the at least one rotor blade is arranged. The rotor often also has a spinner. The rotational assembly can, for example, comprise a rotor support and/or a journal and/or a rotor shaft, which is connected in a torsionally rigid manner to the rotor hub. The rotational assembly can preferably also comprise a generator rotor. As a further preference, the rotational assembly comprises any component to which a rotation of the rotor likewise imparts a rotary motion.

In addition to the rotational assembly, a wind turbine comprises a static assembly, which is fixed in position relative to the rotational assembly. The static assembly comprises, in particular, elements of the kind which are arranged within the nacelle and which do not perform a rotary motion around an axis of rotation of the rotor. The static assembly is thus fixed in position relative to the rotational assembly. Relative to the tower and/or the foundation of the wind turbine, however, the static assembly is generally rotatable around a substantially vertical axis together with the nacelle since wind turbines generally have wind direction tracking, thus enabling the nacelle to rotate about an axis parallel to the longitudinal axis of the tower. Thus, the static assembly which is arranged within the nacelle also rotates relative to a point outside the nacelle, in particular relative to the ground on which the wind turbine has been erected. In the sense according to this application, fixed in position should be taken to mean relative to the rotating rotational assembly. The static assembly comprises a generator stator, a journal, a machine support, a generator housing or a transmission housing, for example. As a further preference, the static assembly comprises an element on which the arresting modules can be arranged.

The toothed disk that can be arranged on the rotational assembly has a plurality of arresting recesses along a circumference. It is possible either for the toothed disk to have an element specially provided for arresting the rotor, which is arranged in a torsionally rigid manner to the rotational assembly, or alternatively, for the toothed disk to be arranged on a known element of the rotational assembly. For example, the toothed disk can be part of a generator rotor disk in that the generator rotor disk has arresting recesses arranged along a circumference. The plurality of arresting recesses along the circumference of the toothed disk forms toothing.

The toothing can have a wave profile, for example, which is distinguished by the fact that the recesses and/or the teeth have a geometry in the form of a partial circle, in particular a semicircle. As a further preference, the toothing can have involute and/or cycloidal toothing. Moreover, sawtooth toothing can also be provided. However, the arresting recesses or teeth formed by the arresting recesses must have a geometry such that the at least one first arresting element and the at least one second arresting element can always be arranged in one of the arresting recesses, despite the spacing between these two arresting elements. In particular, the arresting elements or arresting recesses should be designed in such a way that, when an arresting element is moved into an arresting recess, a shearing movement may possibly take place, thus ensuring that arrangement of an arresting element or of a section of an arresting element in an arresting recess is made possible by the movement of the toothed disk.

The at least one arresting element is arranged on the first arresting module. The first arresting element preferably extends from a module end to an engagement end. By means of the module end, the first arresting element is preferably arranged on and/or in the first arresting module. The first arresting element is preferably arranged on the first arresting module in such a way that the first arresting element can be moved relative to the arresting module. The engagement end of the first arresting element preferably faces away from the arresting module and faces the toothed disk in the operating state. A region adjoining the engagement end preferably has a geometry which represents a negative geometry of the arresting recesses. As a further preference, a region adjoining the engagement end preferably has a geometry which at least partially represents a negative geometry of the arresting recesses. In particular, a region adjoining the engagement end is designed in such a way that, as an arresting element is introduced into an arresting recess in a manner which is not exactly central, a shearing movement and thus also a shearing force arises, in particular in the tangential direction of the toothed disk. It is thus preferably possible to ensure that, in the case where an arresting element is introduced into an arresting recess in a manner which is not exactly central, there is an incremental movement of the toothed disk or of the rotor and, as a result, the arresting element then engages centrally by virtue of this incremental movement and reliable arresting of the rotor can be ensured. Furthermore, this arrangement of the first arresting element has the effect that a shearing force can be exerted on the assembly connected to the toothed disk, and a rotation of this assembly relative to the first arresting element can be made possible. In the case where the assembly is arranged on a rotational assembly of a wind turbine, a rotation of the rotational assembly or rotor can thus be made possible.

These statements apply in a substantially analogous way to the second arresting module and to the at least one second arresting element.

The first arresting module and the second arresting module can be arranged on a static assembly of a wind turbine. The first arresting module and the second arresting module are preferably and substantially not movable in the direction of rotation of the rotational assembly. The at least one first arresting element and/or the at least one second arresting element are/is preferably likewise arranged in a manner fixed in respect of a direction of rotation of the rotational assembly. In particular, this fixed arrangement of the at least one first arresting element and/or of the at least one second arresting element on the first arresting module or the second arresting module is configured in such a way that they can engage in arresting recesses of the toothed disk. For this purpose, the arresting elements are preferably arranged on the arresting modules so as to be movable in the direction of the toothed disk. Moreover, there is the possibility of the arresting elements being arranged in a fixed manner on the arresting modules but the arresting modules being designed to be movable in the direction of the toothed disk with the arresting elements arranged in a fixed manner on said modules.

Engagement of an arresting element in an arresting recess should be taken to mean, in particular, that the arresting element is arranged in the arresting recess of the toothed disk in such a way that the toothed disk cannot move either in a first direction of rotation or in a second direction of rotation. This definition does not take account of any forces required for arresting, and therefore the engagement of two or more arresting elements fully into a plurality of arresting recesses may also be necessary to ensure reliable arresting of the rotor.

In the circumferential direction of the toothed disk, the at least one first arresting element has a spacing from the at least one second arresting element which is a non-integral multiple of a tooth tip spacing of the toothed disk. In particular, a tooth tip spacing should be taken to mean the spacing between two tooth high points of two adjacent teeth. In the case of uniform toothing, this tooth tip spacing is constant along the entire toothed disk. Moreover, it is also possible to provide toothed disks on which the toothing is not constant. In the case of toothing of this kind, there is additionally the possibility of defining tooth tip spacing regions, wherein the tooth tip spacing regions each preferably have a constant tooth tip spacing. Moreover, the tooth tip spacing may be non-constant in some sections by virtue of the provision of individual larger teeth.

The spacing apart of the at least one first arresting element and of the at least one second arresting element makes clear that the at least one first arresting element and the at least one second arresting element cannot simultaneously engage fully in an arresting recess. In the case where the at least one first arresting element engages fully in an arresting recess, the at least one second arresting element does not engage fully in another arresting recess. However, partial engagement of the at least one second arresting element in an arresting recess is possible. In this situation, the second arresting element can be moved further in the direction of the toothed disk and thus in the direction of an engagement position. A corresponding design of the arresting recess and of the arresting elements or of the engagement regions thereof results in a shearing movement, with the result that the toothed disk and thus also the toothing move tangentially, thus enabling the at least one second arresting element to engage fully in an arresting recess. It is evident that the full engagement of the at least one second arresting element in an arresting recess and the tangential movement of the toothed disk mean that the at least one first arresting element can no longer be arranged fully in the previously arranged arresting recess. In this situation, either the at least one first arresting element is switched to a force-free condition and forced out of the engagement position by the movement of the toothed disk, likewise by a shearing movement, or, alternatively, the at least one first arresting element is pulled back actively, e.g., by means of a drive.

In the present case, a wind turbine is taken to mean, in particular, a horizontal-axis wind turbine which is characterized, in particular, in that the rotor sweeps an area during operation which is aligned substantially vertically to the surface of the ground and has a rotor axis which has a substantially horizontal alignment. Wind turbines of this kind are also referred to as horizontal-axis wind turbines. A wind turbine is furthermore taken to mean, in particular, a wind turbine with a rated power of more than 500 kW, and/or more than 1000 kW, and/or more than 1500 kW, and/or more than 2000 kW, and/or more than 2500 kW, and/or more than 3000 kW, and/or more than 3500 kW, and/or more than 4000 kW, and/or more than 4500 kW, and/or more than 5000 kW, and/or more than 5500 kW, and/or more than 6000 kW.

The arresting known in the prior art is in many cases insufficient to achieve a desired position of the rotor. By means of toothing on a toothed disk which is connected in a torsionally rigid manner to the rotational assembly and by means of arresting elements which can engage in this toothing and are, in turn, arranged in a fixed manner on a static assembly, it is possible to significantly improve the resolution of rotational positioning. A shearing force can be achieved between the toothed disk and the arresting elements in the tangential direction of the toothed disk by appropriately shaped arresting elements and correspondingly designed arresting recesses, thus making possible incremental rotation of the toothed disk by the introduction, in particular the central introduction, of an arresting element into an arresting recess. By means of the rotor arresting device, it is furthermore possible to reduce the need for a holding brake or to dispense with a holding brake. Moreover, the frequently necessary spinning or spinning mode is made very largely unnecessary by the possibility of selective rotation. The installation of the rotor blades on the rotor is furthermore simplified since it would be possible to dispense with a ballast arm or banana arm. Moreover, the need for a further generator to rotate the rotor can be reduced or avoided.

In a preferred variant embodiment of the rotor arresting device, it is envisaged that the at least one first arresting element and/or the at least one second arresting element have/has an engagement region, and the engagement region has a negative geometry of one of the arresting recesses, thus enabling the engagement region of the first arresting element and/or of the second arresting element to be arranged, preferably fully, in one of the arresting recesses.

The engagement region is preferably arranged adjoining the engagement end of the arresting elements. In one embodiment of the toothed disk and of the arresting elements, the teeth have a triangular geometry, and the arresting recess arranged between two teeth likewise has a triangular geometry, which preferably has the same dimensions as the triangular geometry of a tooth, and the engagement region, in turn, preferably has the same geometry as one of the teeth. As a result, the engagement region also has a negative geometry of the arresting recesses and can thus be arranged in an engagement position in said recesses.

Another preferred development of the rotor arresting device is distinguished by the fact that the width of the arresting recesses in the circumferential direction decreases in the radial and/or axial direction from an addendum circle diameter to a root circle diameter, wherein this decrease preferably takes place continuously. The addendum circle diameter is formed by connecting the tooth tips of the toothing. The root circle diameter preferably connects the low points of the arresting recesses to one another. The decreasing width of the arresting recesses from the addendum circle diameter toward the root circle diameter results in a good shearing effect as soon as a suitably designed arresting element engages in an arresting recess.

According to another preferred variant embodiment of the rotor arresting device, it is envisaged that the arresting recesses form a uniform toothing, which, in particular, has a constant tooth tip spacing. It is furthermore preferred that the toothed disk has regions which have a constant tooth tip spacing. These regions can be provided at rotational positions of the toothed disk at which precise positioning of the rotor is desirable, for example.

Provision is furthermore preferably made for the at least one first arresting element to be arranged movably on the first arresting module and/or for the at least one second arresting element to be arranged movably on the second arresting module. In this variant embodiment, the first arresting module and/or the second arresting module can be arranged in a fixed manner on the static assembly. By means of the fixed arrangement of the first and/or second arresting module on the static assembly and the movable arrangement of the arresting elements on the arresting modules, it is possible to provide a particularly advantageous embodiment of the rotor arresting device. In this variant embodiment, the arresting modules can ensure the stability and strength of the rotor arresting device, while the arresting elements, which are arranged movably on the arresting modules, provide the required movement.

In a preferred variant embodiment of the rotor arresting device, it is envisaged that the at least one first arresting element and the at least one second arresting element are arranged so as to be movable relative to one another, preferably in the circumferential direction and/or radial direction and/or axial direction of the rotational assembly. In a preferred variant embodiment, it is possible, in particular, to move the arresting elements relative to one another in the tangential direction of the toothed disk. Here, it is also possible for a first arresting element and a second arresting element to engage fully in an arresting recess. Another variant embodiment preferably envisages that the first arresting module and/or the second arresting module can be arranged movably on the static assembly, thus ensuring that the arresting elements can also be moved relative to one another.

Another preferred development of the rotor arresting device is characterized in that the first arresting module and/or the second arresting module are/is designed to move the at least one first arresting element and/or the at least one second arresting element in the engagement direction from a standby position into an engagement position, wherein the at least one first arresting element and/or the at least one second arresting element preferably do or does not engage in one of the arresting recesses in the standby position and engage or engages in one of the arresting recesses in the engagement position. When the arresting elements are in a standby position, the toothed disk can perform a rotary motion without being hindered in this rotary motion by the arresting elements. In particular, there is no direct contact between one of the arresting elements and the toothed disk when the arresting elements are in the standby position. However, the arresting elements can be moved from the standby position into the engagement position.

Provision is furthermore preferably made for the engagement direction of the at least one first arresting element and/or of the at least one second arresting element to be oriented in the radial direction and/or in the axial direction of an axis of rotation of the rotational assembly. When the engagement direction of the at least one first arresting element and/or of the at least one second arresting element is oriented in the radial direction of the axis of rotation of the rotational assembly, the toothed disk is preferably provided as an externally toothed toothed disk. This means, in particular, that the toothing is arranged on an outer circumference of the toothed disk. Moreover, there is the possibility of a radial engagement direction if the arresting recesses or teeth of the toothed disk can be reached by an arresting element from a radial direction. An engagement direction of the at least one first arresting element and/or of the at least one second arresting element in the axial direction of the axis of rotation of the rotational assembly is preferably provided when the toothed disk has toothing on an end face. Moreover, there is the possibility of an axial engagement direction if the arresting recesses or teeth of the toothed disk can be reached by an arresting element from an axial direction.

In a particularly preferred variant embodiment of the rotor arresting device, provision is made for a tooth height of the teeth of the toothed disk to be oriented parallel to and/or radially with respect to the axis of rotation of the rotational assembly. The tooth height of a tooth preferably extends from a tooth tip as far as a central point on the tooth root thereof.

According to another preferred variant embodiment of the rotor arresting device, it is envisaged that a number of arresting recesses is from 45 to 720, in particular from 90 to 360.

Another preferred development of the rotor arresting device is characterized by the fact that the first arresting module and/or the second arresting module can be arranged on a support frame and/or on a base support and/or on a generator stator, in particular on a stator support, and/or on a machine support, and/or on a bearing device of the main shaft. Provision is furthermore preferably made for the toothed disk to be arranged on a generator rotor and/or on a rotor disk and/or on a main shaft and/or on an input side of a transmission and/or on an output side of a transmission.

It is furthermore preferred if the rotor arresting device comprises a control device which is arranged and designed to move the at least one first arresting element in the engagement direction into an engagement position, with the result that the toothed disk is arrested in at least one direction of rotation, preferably in both directions of rotation, by the engagement of the at least one first arresting element in one of the arresting recesses. This arresting, particularly in both directions of rotation, can be achieved, for example, by arranging the arresting element fully in an arresting recess. The control device is preferably likewise arranged and designed to move the at least one second arresting element in the engagement direction into an engagement position, with the result that the toothed disk is arrested in at least one direction of rotation, preferably in both directions of rotation, by the engagement of the at least one second arresting element in one of the arresting recesses.

Another particularly preferred variant embodiment of the rotor arresting device comprises a control device which is arranged and designed to move the at least one second arresting element in the engagement direction into an engagement position, wherein the at least one first arresting element is moved into a standby position in such a way that the toothed disk is always arrested in both directions of rotation during the movement of the first arresting element and the second arresting element. By virtue of the spacing apart of the first arresting element and the second arresting element, the first arresting elements preferably arrest the toothed disk in a first direction of rotation, and the second arresting elements arrest the toothed disk in a second direction of rotation, which is opposite to the first direction of rotation, as soon as one arresting element is moved into the engagement position and the respective other arresting elements are moved out into a standby position.

According to another aspect of the present invention, the object stated at the outset is achieved by a wind turbine having a nacelle, a rotational assembly and a static assembly, comprising a rotor arresting device according to at least one of the variant embodiments described above.

According to another aspect of the present invention, the object stated at the outset is achieved by a method for arresting and/or rotating a rotor of a wind turbine, in particular of a wind turbine according to the preceding aspect, comprising providing a rotor arresting device according to at least one of the variant embodiments described above, moving the at least one first arresting element, which is arranged and designed to engage in an arresting recess of a toothed disk in the engagement direction into an engagement position, with the result that the toothed disk is arrested in at least one direction of rotation, preferably in both directions of rotation, by the engagement of the at least one first arresting element.

Another preferred development of the method comprises the steps of moving the at least one second arresting element, which is arranged and designed to engage in one of the arresting recesses of the toothed disk, in the engagement direction into an engagement position, with the result that the toothed disk is arrested in at least one direction of rotation, preferably in both directions of rotation by the engagement of the at least one second arresting element, moving the at least one first arresting element into a standby position, in which the at least one first arresting element does not engage in one of the arresting recesses of the toothed disk, wherein the movement of the first arresting element and the movement of the second arresting element takes place in such a way that the toothed disk is arrested in at least one direction of rotation, preferably in both directions of rotation, during these movements. By means of this arresting, it is possible to ensure that the rotational assembly, on which the toothed disk is arranged, does not spin or move in an uncontrolled manner between two rotational positions during the rotation.

According to another aspect of the present invention, the object stated at the outset is achieved by a method for arresting and/or rotating a rotor of a wind turbine, in particular of a wind turbine according to the preceding aspect, comprising providing a rotor arresting device according to at least one of the variant embodiments described above having a third arresting module having a third arresting element, wherein the first arresting module comprises a first arresting element and the second arresting module comprises a second arresting element, wherein the second arresting element is arranged adjacent to the first arresting element, and the third arresting element is arranged adjacent to the second arresting element, and wherein the toothed disk comprises at least one first tooth, a second tooth arranged adjacent to the first tooth, a third tooth arranged adjacent to the second tooth, a fourth tooth arranged adjacent to the third tooth, a fifth tooth arranged adjacent to the fourth tooth, a sixth tooth arranged adjacent to the fifth tooth, moving the first arresting element into an engagement position between the first tooth and the second tooth, and moving the second arresting element onto a tooth flank of the third tooth which faces away from the second tooth, moving the second arresting element into an engagement position between the third tooth and the fourth tooth, wherein the second arresting element performs a shearing movement against the tooth flank of the third tooth which faces away from the second tooth, passively or actively moving the first arresting element against a tooth flank of the second tooth which faces the first tooth and moving the third arresting element onto a tooth flank of the fifth tooth which faces away from the fourth tooth, moving the third arresting element into an engagement position between the fifth tooth and the sixth tooth, wherein the third arresting element performs a shearing movement against the tooth flank of the fifth tooth which faces away from the fourth tooth, passively or actively moving the second arresting element against a tooth flank of the fourth tooth which faces the third tooth and moving the first arresting element into a standby position.

In the case of an intended further rotation of the toothed disk, the method furthermore preferably comprises, following the method steps described above, the steps of moving the first arresting element into an engagement position between the second tooth and the third tooth, wherein the first arresting element performs a shearing movement against the tooth flank of the second tooth which faces away from the first tooth, and passively or actively moving the third arresting element against a tooth flank of the sixth tooth which faces the fifth tooth, and moving the second arresting element into a standby position.

The method according to the invention and the possible developments thereof have features or method steps which make them suitable, in particular, to be used for a rotor arresting device according to the invention and the developments thereof. For further advantages, variant embodiments and embodiment details of these further aspects and the possible developments thereof, attention is also drawn to the above description of the corresponding features and developments of the rotor arresting device.

BRIEF DESCRIPTION OF THE SEVERAL VIEWS OF THE DRAWINGS

Preferred embodiments of the invention are explained by way of example by means of the attached figures. In the drawings.

DETAILED DESCRIPTION

Figure 1:
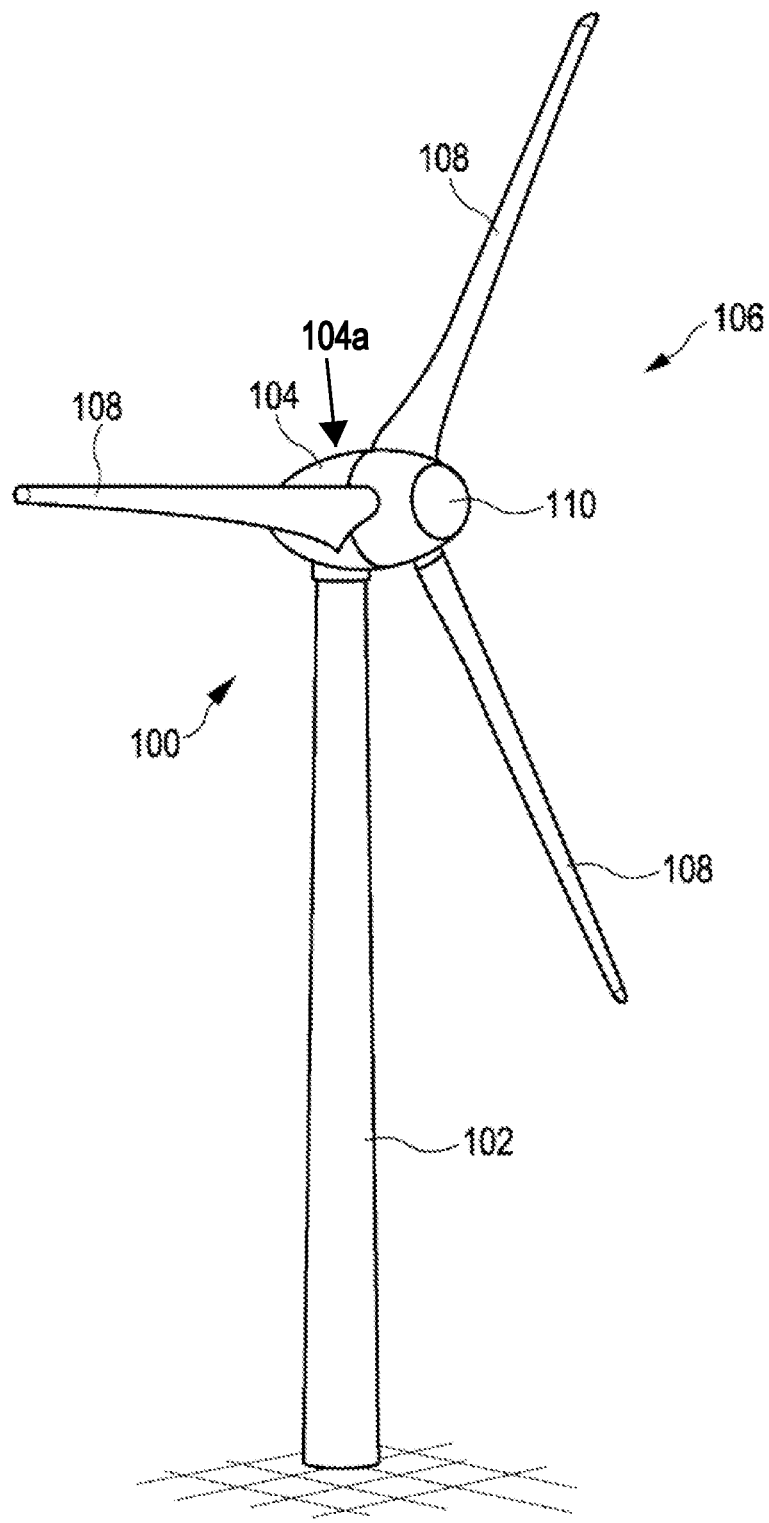
FIG. 1 shows a schematic view of a wind turbine.

In the figures, identical or substantially functionally identical or similar elements are denoted by the same reference signs. FIG. 1 shows a schematic view of an illustrative embodiment of a wind turbine. FIG. 1 shows, in particular, a wind turbine 100 having a tower 102 and a nacelle 104. A rotor 106 having three rotor blades 108 and a spinner 110 are arranged on the nacelle 104. During operation, a rotary motion is imparted to the rotor 106 by the wind and, as a result, it drives a generator on the nacelle 104. The wind turbine 100 shown in FIG. 1 preferably has a rotor arresting device according to the invention in order to arrest the rotor 106 (or rotor assembly) relative to a static assembly 104a in a substantially arbitrary rotational position. For example, it may be necessary for the rotor to be positioned in such a way that the longitudinal axis of the rotor blade 108 is aligned parallel to the longitudinal axis of the tower 102 in order to remove said rotor blade.

Figure 2A:
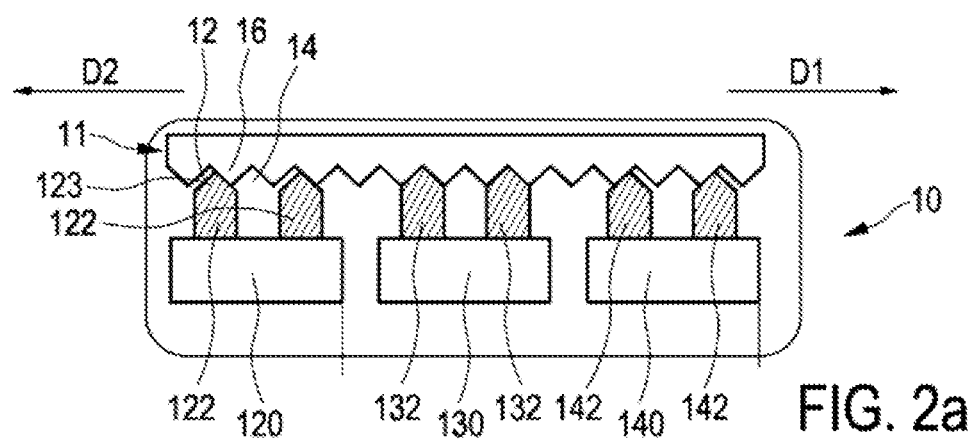
FIG. 2a shows a schematic view of an illustrative embodiment of a rotor arresting device.
Figure 2B:
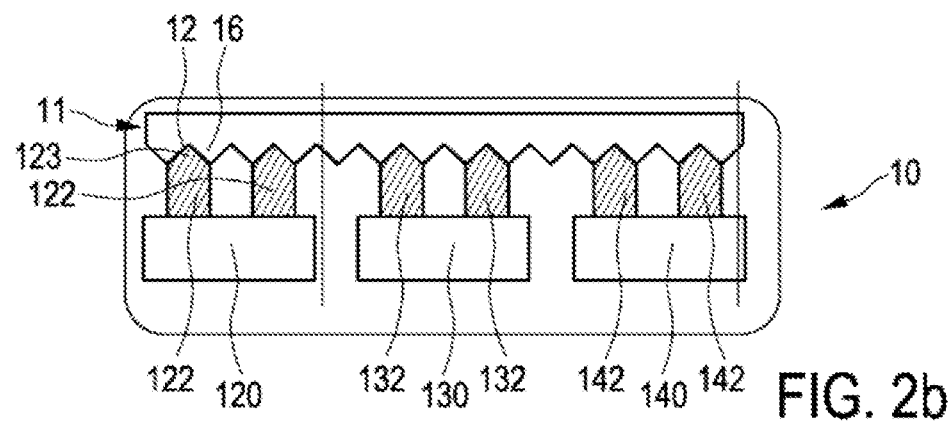
FIG. 2b shows a schematic view of another illustrative embodiment of a rotor arresting device with tangentially movable arresting modules.

FIGS. 2a and 2b each show a rotor arresting device 10 with a first arresting module 120, a second arresting module 130 and a third arresting module 140. Moreover, the rotor arresting device 10 has a toothed disk 11. The first arresting module 120 has two first arresting elements 122. The first arresting elements 122 are arranged on the side of the first arresting module 120 which faces the toothing of the toothed disk 11. Furthermore, the first arresting elements 122 are arranged movably on the first arresting module 120, in particular in such a way as to be movable in a direction from the first arresting module 120 to the toothed disk 11 and in the opposite direction. Similarly to the first arresting module 120, the second arresting module 130 has second arresting elements 132. The third arresting module 140 likewise has two third arresting elements 142. The second arresting elements 132 and the third arresting elements 142 are each arranged on the arresting modules in a manner similar to the arrangement of the first arresting elements on the first arresting module 120.

The toothed disk 11 has a multiplicity of arresting recesses. Here in the present case, by way of example, the two adjacent arresting recesses 12 and 14 are denoted by a reference sign, wherein the arresting recesses 12, 14 form a tooth 16 between them. The arresting recesses 12, 14 on the toothed disk 11 have a triangular shape. The teeth 16 of the toothed disk 11 likewise have a triangular shape. The first arresting elements 122 extend from a module end (not shown) as far as an engagement end 123. The module end which is not shown faces the arresting module 120. The engagement end 123 faces the toothed disk 11. An engagement region adjoining the engagement end 123 of the first arresting element 122 has a triangular shape which corresponds substantially to the negative geometry of the arresting recesses.

FIG. 2a illustrates the situation, in which the second arresting elements 132 are in an engagement position. In the engagement position, the engagement regions adjoining the engagement ends are arranged fully within the arresting recess, thus ensuring that the toothed disk can perform substantially no rotary motion in a first tangential direction D1 and/or in a second tangential direction D1. In this situation, the first arresting elements 122 and the third arresting elements 142 are furthermore not arranged fully within the arresting recesses. Pushing the first arresting elements 122 further in and removing the force from and/or actively retracting the second and third arresting elements 132, 142 would result in the toothed disk 11 rotating tangentially in a first tangential direction D1 owing to the complete positioning of the first engagement elements 122 in an engagement position. On the other hand, the toothed disk could be rotated in a second tangential direction D2 opposed to the first tangential direction D1 if, in the situation shown in FIG. 2a, the third arresting elements 142 were arranged fully in the arresting recesses.

The arrangement of three arresting modules, each having at least one arresting element, thus makes it possible, as shown in FIG. 2a, to achieve arresting of a toothed disk and rotation in two opposite directions D1, D2. The embodiment shown in FIG. 2b differs from the embodiment shown in FIG. 2a in particular by the fact that the spacing of the first arresting elements from the second and third arresting elements is not a non-integral multiple; on the contrary, they have a spacing which is an integral multiple of a tooth tip spacing of the toothed disk. Thus, in FIG. 2b, the first, second and third arresting elements 122, 132, 142 can all be arranged in an engagement position. This is possible, for example, if the arresting modules 120, 130, 140 are designed to be movable, preferably movable to a slight extent, in the tangential direction of the toothed disk. Furthermore, this can be achieved by arranging the arresting elements movably on the arresting modules in such a way that these can move in tangential directions D1, D2.

Figure 3:
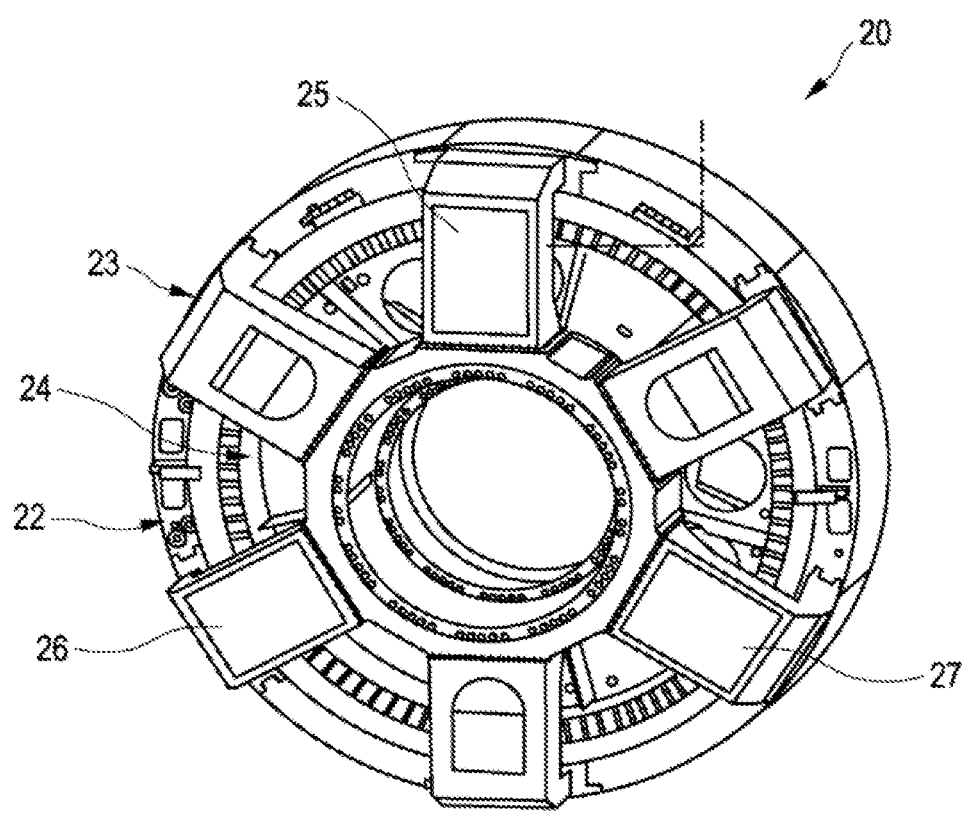
FIG. 3 shows a schematic three-dimensional view of an illustrative embodiment of a generator having three rotor arresting devices.

FIG. 3 shows a possible arrangement of the rotor arresting device on a generator. The generator 20 comprises a generator stator 22 and a generator rotor 24, which is connected in a torsionally rigid manner to a drive shaft or to a constituent part of a rotational assembly of a wind turbine. The generator stator 22 furthermore has a stator disk 23 connected in a torsionally rigid manner thereto. A first arresting module 25, a second arresting module 26 and a third arresting module 27 are illustrated schematically on the stator disk 23. The arresting elements (not illustrated) extend in the direction of a rotor disk, which is connected in a torsionally rigid manner to the generator rotor. The toothed disk, which has the arresting recesses into which the arresting elements of the arresting modules 25, 26, 27 can engage in order to arrest the toothed disk, is also arranged on the generator rotor 24. Arresting of the rotational assembly or of the rotor can be ensured by the torsionally rigid connection of the toothed disk to the generator rotor 24 and the torsionally rigid connection thereof to a rotational assembly, which is illustrated with an aerodynamic rotor, as in FIG. 1, for example.

Figure 4A:
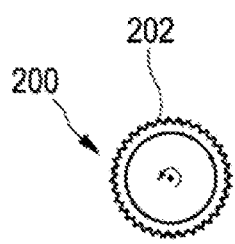
FIG. 4a shows a schematic view of an illustrative embodiment of an externally toothed toothed disk.
Figure 4B:
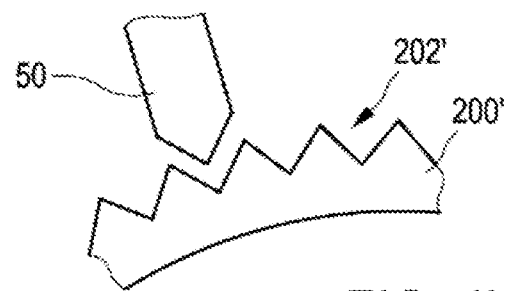
FIG. 4b shows a schematic partial view of an illustrative embodiment of a rotor arresting device with an externally toothed toothed disk in accordance with FIG. 4a with sawtooth toothing.
Figure 4C:
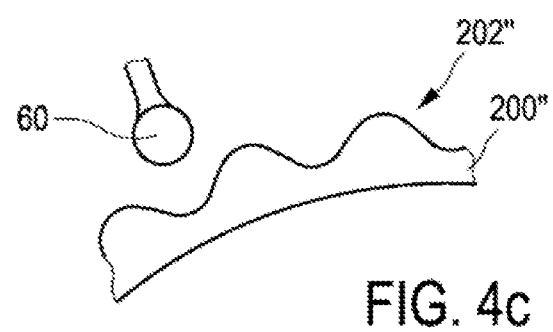
FIG. 4c shows a schematic partial view of an illustrative embodiment of a rotor arresting device with an externally toothed toothed disk in accordance with FIG. 4a with undulating toothing.

FIGS. 4a, 4b and 4c show one possible embodiment of the toothed disk 200 with toothing 202 which is arranged on a radial circumferential surface of the toothed disk 200. The toothing 202 can also be referred to as radial outer toothing. The toothed disk 200' in FIG. 4b has triangular toothing 202'. Moreover, an arresting element 50 corresponding to this triangular toothing 202' is illustrated. The arresting element 50 has a triangular engagement region, which is substantially a negative geometry of the arresting recess of the toothing 202'. An arresting element 50 of this kind can also be referred to as a wedge shape. FIG. 4c illustrates an alternative to the embodiment in FIG. 4b, having a toothed disk 200" and toothing 202" which has an undulating profile or undulating toothing. An arresting element 60 corresponding to this undulating profile 202" has an engagement region that has a round geometry. An arresting element of this kind can have the geometry of a roller, for example, and therefore the abovementioned round geometry for engagement in the toothing 202" can be provided in a corresponding cross section.

Figure 5A:
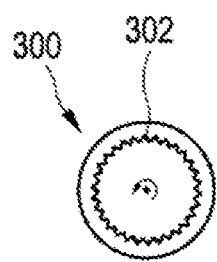
FIG. 5a shows a schematic view of an illustrative embodiment of an internally toothed toothed disk.
Figure 5B:
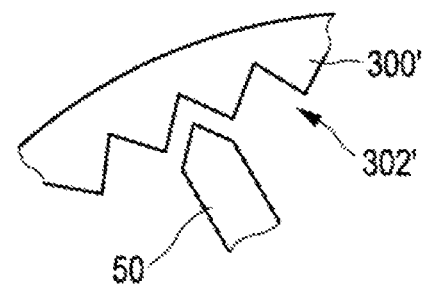
FIG. 5b shows a schematic partial view of an illustrative embodiment of a rotor arresting device with an internally toothed toothed disk in accordance with FIG. 5a with sawtooth toothing.
Figure 5C:
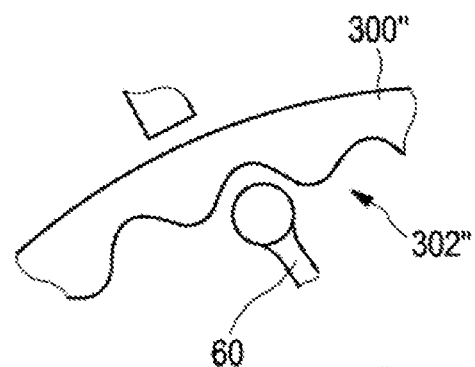
FIG. 5c shows a schematic partial view of an illustrative embodiment of a rotor arresting device with an internally toothed toothed disk in accordance with FIG. 5a with undulating toothing.

FIGS. 5a, 5b and 5c illustrate embodiments of the rotor arresting device of the kind that are possible with a toothed disk 300, wherein the toothed disk 300 has toothing 302 on a radial inner circumferential surface. FIG. 5b shows how a wedge-shaped arresting element 50 can engage in such inner toothing 302' of a toothed disk 300'. FIG. 5c shows how a roller-shaped arresting element 60 with a circular cross section can engage in an undulating profile 302" of a toothed disk 300".

Figure 6A:
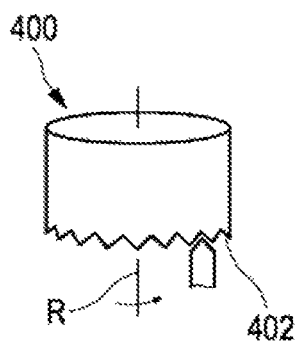
FIG. 6a shows a schematic view of an illustrative embodiment of a toothed disk with end-face teeth.
Figure 6B:
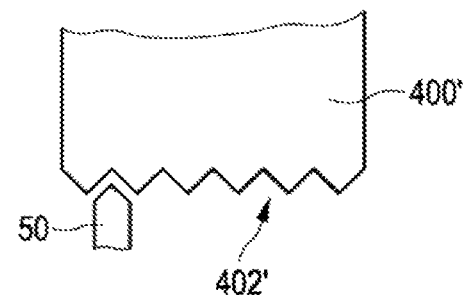
FIG. 6b shows a schematic partial view of an illustrative embodiment of a rotor arresting device with a toothed disk with end-face teeth in accordance with FIG. 6a with sawtooth toothing.
Figure 6C:
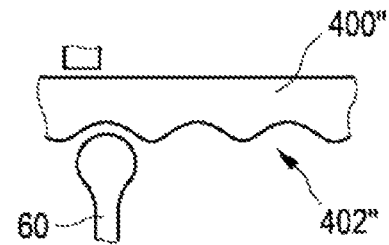
FIG. 6c shows a schematic partial view of an illustrative embodiment of a rotor arresting device with a toothed disk with end-face teeth in accordance with FIG. 6a with sawtooth toothing.

FIGS. 6a, 6b and 6c illustrate embodiments in which the toothed disk 400 has toothing 402 on an end face, with the result that the tooth heights of the toothing are aligned substantially parallel to an axis of rotation R of the rotary disk 400. FIG. 6b shows the embodiment illustrating how a wedge-shaped arresting element 50 can engage in the toothing 402' of the toothed disk 400'. FIG. 6c illustrates the embodiment of a toothed disk 400" having undulating toothing 402" with a roller-shaped arresting element 60.

Figure 7A:
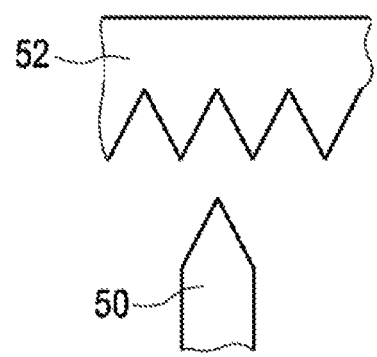
FIG. 7a shows a schematic segment of an illustrative embodiment of a rotor arresting device with an arresting element in a standby position.
Figure 7B:
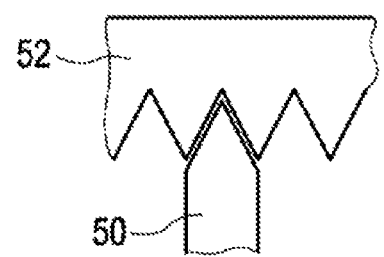
FIG. 7b shows a schematic segment of an illustrative embodiment of a rotor arresting device with an arresting element in an engagement position.

The difference between an engagement position and a standby position is shown in FIGS. 7a and 7b. FIG. 7a illustrates how a wedge-shaped arresting element 50 is arranged relative to a toothed disk 52 in a standby position. FIG. 7b shows how the toothed disk 52 and the arresting element 50 are arranged when the arresting element 50 is in an engagement position.

Figure 8A:
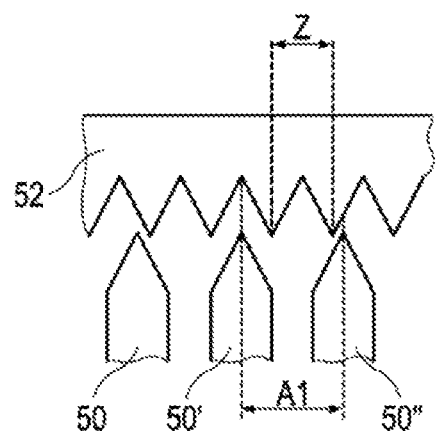
FIG. 8a shows a schematic partial view of an illustrative embodiment of a rotor arresting device with three arresting elements in a standby position.
Figure 8B:
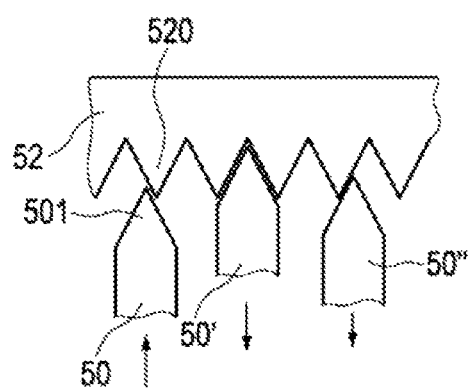
FIG. 8b shows a schematic partial view of an illustrative embodiment of a rotor arresting device with arresting elements in a partial or full engagement position.

FIGS. 8a and 8b show the standby positions and engagement positions, respectively, of wedge-shaped arresting elements 50, 50', 50". Similarly to FIG. 2a, the arresting elements 50, 50', 50" are spaced apart at a non-integral multiple of the tooth tip spacing Z. The arresting elements 50, 50', 50" are each spaced apart at a spacing A1, wherein the spacing A1 is unequal to the tooth tip spacing Z. It is therefore not possible for all the arresting elements 50, 50', 50" to be arranged simultaneously in an engagement position. FIG. 8b illustrates a possibility for the rotation of the toothed disk 52 by the arresting elements 50, 50', 50". When the arresting element 50 moves in the direction of the toothed disk and there is a shearing movement between the engagement region 501 of engagement element 50 and a tooth 520 of the toothed disk 52, the toothed disk 52 is here rotated in the direction of the further arresting elements 50, 50' in the present case. To enable this, the arresting elements 50' and 50" are switched to a force-free condition or moved in an opposite direction to the arresting element 50, thus ensuring that they no longer arrest the toothed disk.

Figure 9A:
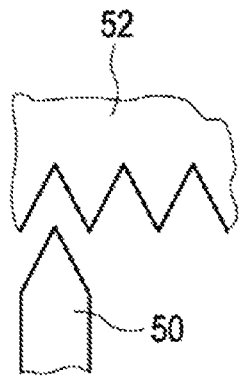
FIG. 9a shows a schematic view of an illustrative embodiment of a toothed disk with sawtooth toothing and a corresponding arresting element.
Figure 9B:
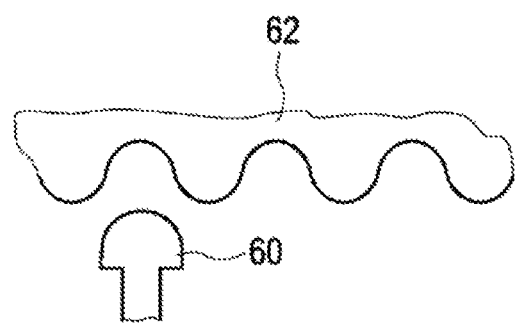
FIG. 9b shows a schematic view of an illustrative embodiment of a toothed disk with undulating toothing and a corresponding arresting element.
Figure 9C:
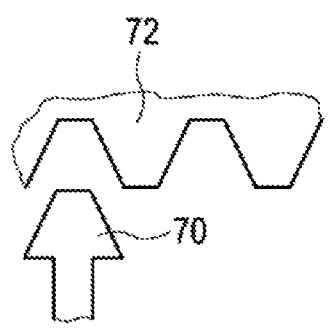
FIG. 9c shows a schematic view of an illustrative embodiment of a toothed disk with trapezoidal toothing and a corresponding arresting element.

FIGS. 9a, 9b and 9c illustrate different embodiments of arresting elements 50, 60, 70, which can bring about advantageous effects in different situations. When arresting elements 70 with a conical engagement region as shown in FIG. 9c are provided, it should be ensured in the arrangement of the arresting elements or the design of the control device that an arresting element is not in a tooth-on-tooth situation, in which the arresting element remains on a tooth tip without being able to enter an arresting recess by a shearing movement. The embodiment in FIG. 9b with an arresting element 60 has the particular advantage that there is little possibility it will jam.

Figure 10A:
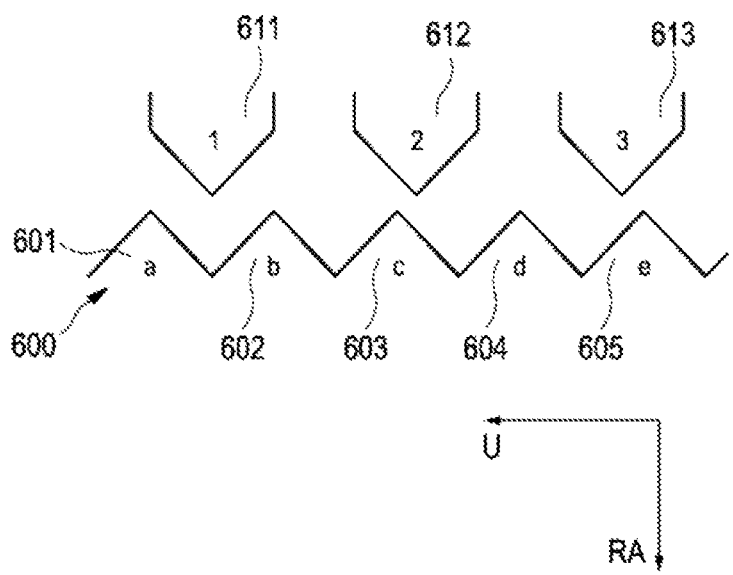
FIGS. 10a-e show schematic views of another illustrative embodiment of an illustrative embodiment of a rotor arresting device with three arresting elements in various positions of a method for arresting and/or rotating a rotor of a wind turbine.

FIGS. 10a-e show schematic views of another illustrative embodiment of an illustrative embodiment of a rotor arresting device with three arresting elements in various positions of a method for arresting and/or rotating a rotor of a wind turbine. In a first arrangement, which is shown in FIG. 10a, a first arresting element 611, a second arresting element 612 and a third arresting element 613 are in a standby position. In the standby position, the arresting elements 611, 612, 613 are not arranged in one of the recesses of a toothed disk 600. The recesses of the toothed disk 600 are formed at least by a first tooth 601, a second tooth 602 arranged adjacent to the first tooth, a third tooth 603 arranged adjacent to the second tooth, a fourth tooth 604 arranged adjacent to the third tooth, a fifth tooth 605 arranged adjacent to the fourth tooth, and a sixth tooth 606 arranged adjacent to the fifth tooth. The teeth 601-606 each have a cross section orthogonally to the circumferential direction U and orthogonally to the radial direction RA of the toothed disk 600, wherein the cross section has the geometry of an isosceles triangle. The height of the isosceles triangle is aligned in the radial direction. The cross section of the teeth 601-606 is furthermore designed in such a way that the arresting recesses formed by the teeth 601-606 have the same cross-sectional geometry as the teeth 601-606. The arresting elements 611, 612, 613 likewise have a triangular geometry at their ends facing the toothed disk 600 or in their regions adjoining these ends. In particular, the arresting elements 611, 612, 613 here have a geometry which forms a negative of the recesses, thus enabling these regions of the arresting elements to be arranged substantially fully in the recesses.

The teeth 601-606 are spaced apart equidistantly, with the result that the recesses are also spaced apart equidistantly. The arresting elements 611, 612, 613 are likewise spaced apart equidistantly, wherein the spacing between two arresting elements is a non-integral multiple of a tooth tip spacing of two adjacently arranged teeth. In general, therefore, there is no possibility that two arresting elements will be in an engagement position simultaneously.

Figure 10B:
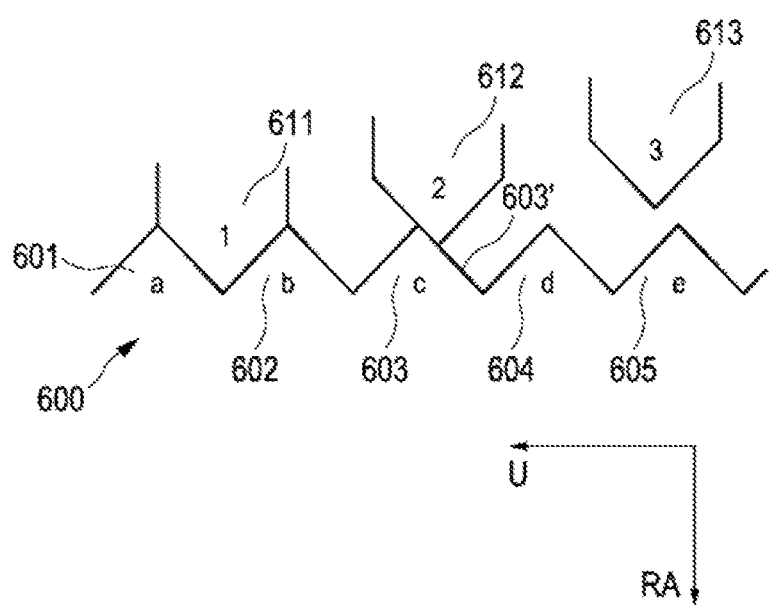

In FIG. 10b, the first arresting element 611 is in an engagement position between the first tooth 601 and the second tooth 602. This arrangement prevents the toothed disk 600 from rotating in the circumferential direction U. The second arresting element 612 is in a position which is arranged between an engagement position and a standby position in the radial direction RA. In this position, the second arresting element 612 is at a tangent to the tooth flank 603' of the third tooth 603 which faces away from the second tooth 602. The third arresting element 613 remains in a standby position.

Figure 10C:
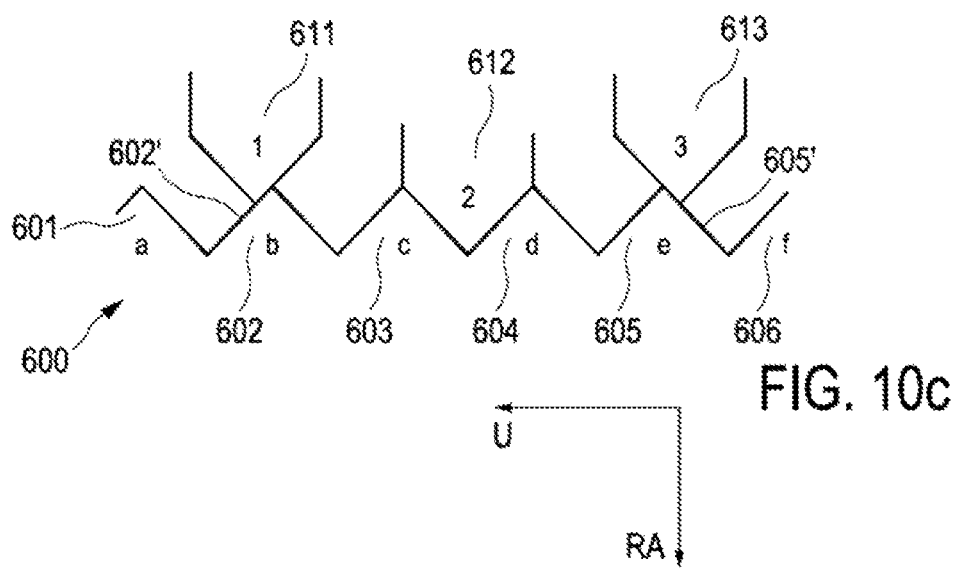

From the arrangement shown in FIG. 10b to the arrangement shown in FIG. 10c, the second arresting element 612 has been moved further in the radial direction and has ultimately been moved into an engagement position. To enable the second arresting element 612 to be moved into the engagement position, said element had to perform a shearing movement against the tooth flank 603' and move the toothed disk 600 in the circumferential direction U in the direction of the first arresting element 611. To enable this to occur, the first arresting element 611 was either switched to the force-free condition or actively retracted from the engagement position. To ensure that the toothed disk 600 is in a state which is as stable as possible, it is particularly preferred if the first arresting element 611 is actively retracted in such a way that, as it is retracted, it performs a continuous shearing movement against a tooth flank 602' of the second tooth 602 which faces the first tooth 601. The third arresting element 613 is in a position which is arranged between an engagement position and a standby position in the radial direction RA. In this position, the third arresting element 613 is at a tangent to the tooth flank 605' of the fifth tooth 605 which faces away from the fourth tooth 604.

Figure 10D:
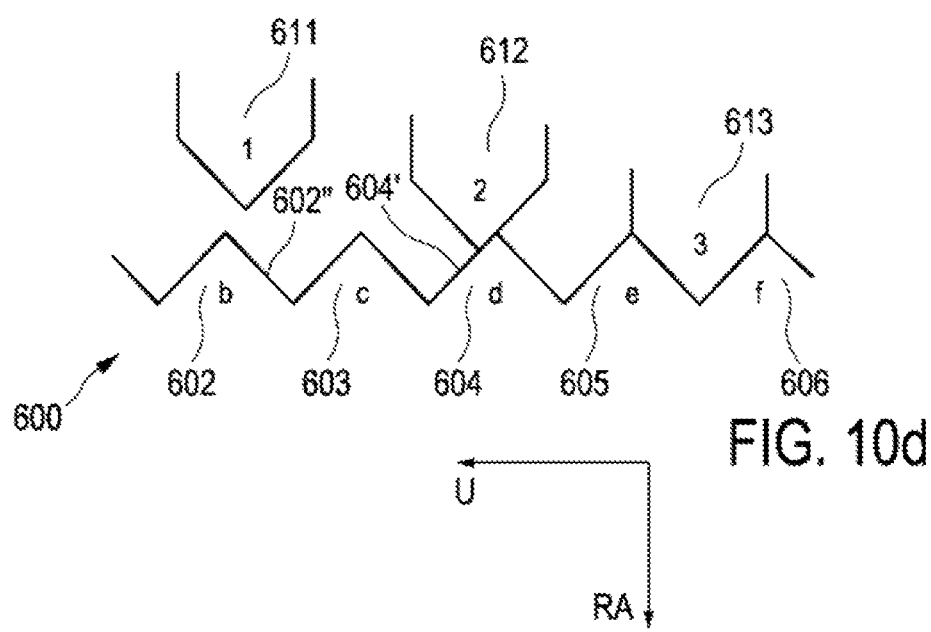

From the arrangement shown in FIG. 10c to the arrangement shown in FIG. 10d, the third arresting element 613 has been moved further in the radial direction and has ultimately been moved into an engagement position. To enable the third arresting element 613 to be moved into the engagement position, said element had to perform a shearing movement against the tooth flank 605' and move the toothed disk 600 in the circumferential direction U in the direction of the second arresting element 612. To enable this to occur, the second arresting element 612 was either switched to the force-free condition or actively retracted from the engagement position. The first arresting element 611 was moved into a standby position.

Figure 10E:
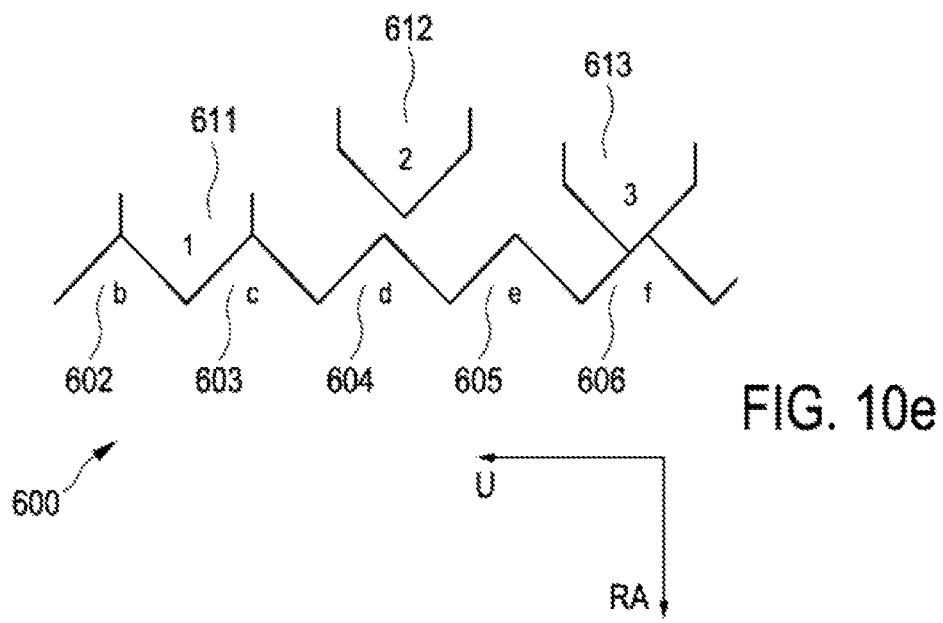

From the arrangement shown in FIG. 10d to the arrangement shown in FIG. 10e, the first arresting element 611 has been moved back from the last-mentioned standby position into an engagement position and, during this process, has performed a shearing movement against the tooth flank 602" of the second tooth 602 which faces the third tooth 603 and has thus moved the toothed disk in the circumferential direction U once again.

Particularly because of the claimed spacing A1 between the arresting elements in comparison with the tooth tip spacing Z, the rotor arresting device illustrated here has the particular advantage that said device can rotate a toothed disk incrementally in the tangential direction and can thus also rotate the aerodynamic rotor of a wind turbine in small steps. It is thus possible to achieve substantially any desired positioning of the aerodynamic rotor. With positioning in this way, it is furthermore possible to ensure, in particular, that positions which are desirable for maintenance and/or assembly and/or removal steps, for example, can be reached. Moreover, it is possible, through the provision of a plurality of arresting modules 120, 130, 140, 25, 26, 27 to create the possibility of moving the toothed disk in a first direction of rotation and in a second direction of rotation opposed to said first direction. Moreover, the geometry of the arresting elements, which bring about a shearing movement in the toothing of the toothed disk, avoids jamming during the arresting process. Thus, improved releasability of the arresting is also ensured.

REFERENCE SIGNS 10 rotor arresting device
11 toothed disk
12 arresting recess
14 arresting recess
16 tooth
20 generator
22 generator stator
23 stator disk
24 generator rotor
25 first arresting module
26 second arresting module
27 third arresting module
50, 50', 50" wedge-shaped arresting element
52 toothed disk with wedge-shaped toothing
60 roller-shaped arresting element
62 toothed disk with undulating toothing
70 conical arresting element
72 toothed disk with conical toothing
100 wind turbine
102 tower
104 nacelle
106 rotor
108, 108' rotor blade
110 spinner
120 first arresting module
122 first arresting elements
123 engagement end
130 second arresting module
132 second arresting elements
140 third arresting module
142 third arresting elements
200, 200', 200" toothed disk
202, 202', 202" toothing
300, 300', 300" toothed disk
302, 302', 302" toothing
400, 400', 400" toothed disk
402, 402', 402" toothing
500 tooth pairing
501 engagement region
520 tooth
600 toothed disk
601 first tooth
602 second tooth
602' tooth flank of the second tooth which faces the first tooth
602" tooth flank of the second tooth which faces the third tooth
603 third tooth
603' tooth flank of the third tooth which faces away from the
second tooth
604 fourth tooth
604' tooth flank of the fourth tooth which faces the third tooth
605 fifth tooth
605' tooth flank of the fifth tooth which faces away from the
fourth tooth
606 sixth tooth
611 first arresting element
612 second arresting element
613 third arresting element
A1 spacing of arresting elements
D1 first tangential direction
D2 second tangential direction
R axis of rotation
RA radial direction
U circumferential direction
Z tooth tip spacing

The invention claimed is:
1. A rotor arresting device for a wind turbine having a rotor, a rotational assembly connected in a torsionally rigid manner to the rotor, and a static assembly fixed in position relative to the rotational assembly, the rotor arresting device comprising:

a toothed disk configured to be arranged on the rotational assembly, the toothed disk having a plurality of arresting recesses arranged along a circumference, wherein two adjacent arresting recesses of the plurality of arresting recesses form a tooth;

a first arresting module having a first arresting element; and a second arresting module having a second arresting element, wherein the first arresting module and the second arresting module are configured to be arranged on the static assembly, wherein the first arresting element and the second arresting element are arranged and configured to engage in the plurality of arresting recesses of the toothed disk, and wherein a spacing between the first arresting element and the second arresting element in a circumferential direction of the toothed disk is a non-integral multiple of a tooth tip spacing between adjacent teeth of the toothed disk so that the first arresting element is partially but not arranged fully within one of the arresting recesses of the plurality of arresting recesses when the second arresting element is in an engagement position.

2. The rotor arresting device as claimed in claim 1, wherein the first arresting element and the second arresting element have an engagement region, and wherein the engagement region has a geometry corresponding to the arresting recesses, thus enabling engagement between the engagement region within a respective one of the arresting recesses when in the engagement position.

3. The rotor arresting device as claimed in claim 1, wherein the plurality of arresting recesses form a plurality of teeth that have a constant tooth tip spacing between adjacent teeth.

4. The rotor arresting device as claimed in claim 1, wherein the first arresting element is arranged movably on the first arresting module, and wherein the second arresting element is arranged movably on the second arresting module.

5. The rotor arresting device as claimed in claim 1, wherein at least one of the first arresting module or the second arresting module is configured to move the first arresting element or the second arresting element, respectively, in an engagement direction from a standby position into the engagement position, wherein the first arresting element and the second arresting element do not engage in one of the arresting recesses when in the standby position and engages in one of the arresting recesses when in the engagement position.

6. The rotor arresting device as claimed in claim 1, wherein an engagement direction of the first arresting element and the second arresting element are oriented in a radial direction or an axial direction of an axis of rotation of the rotational assembly.

7. The rotor arresting device as claimed in claim 1, wherein a tooth height of each of the teeth of the toothed disk is oriented parallel to or radially with respect to an axis of rotation of the rotational assembly.

8. The rotor arresting device as claimed in claim 1, wherein at least one arresting module of the first arresting module and the second arresting module is configured to be arranged on a generator stator.

9. The rotor arresting device as claimed in claim 1, wherein the toothed disk is configured to be arranged on at least one of a generator rotor or a rotor disk of the generator rotor.

10. The rotor arresting device as claimed in claim 1, wherein the first arresting element is configured to be moved into a standby position such that the toothed disk is arrested in two directions of rotation by the first arresting element and the second arresting element.

11. A wind turbine, comprising:

a nacelle; and the rotor arresting device, as claimed in claim 1, including the rotational assembly and the static assembly.

12. A method, comprising:

arresting the rotor of the wind turbine using the rotor arresting device as claimed in claim 1, wherein the arresting comprises moving the first arresting element in an engagement direction and into a first engagement position such that the toothed disk is arrested in at least one direction of rotation by the engagement of the first arresting element.

13. The method as claimed in claim 12, comprising:

moving the second arresting element in the engagement direction into a second engagement position wherein the toothed disk is arrested in the at least one direction of rotation by the engagement of the second arresting element; and moving the first arresting element into a standby position, in which the first arresting element does not engage in one of the arresting recesses of the toothed disk, wherein moving the first arresting element and moving the second arresting element takes place such that the toothed disk is arrested in the at least one direction of rotation.

14. A method for arresting the rotor of the wind turbine, the method comprising:

providing the rotor arresting device as claimed in claim 1, and further comprising a third arresting module having a third arresting element, wherein the second arresting element is arranged adjacent to the first arresting element, wherein the third arresting element is arranged adjacent to the second arresting element, and wherein the toothed disk comprises a first tooth, a second tooth arranged adjacent to the first tooth, a third tooth arranged adjacent to the second tooth, a fourth tooth arranged adjacent to the third tooth, a fifth tooth arranged adjacent to the fourth tooth, and a sixth tooth arranged adjacent to the fifth tooth;

moving the first arresting element into an engagement position between the first tooth and the second tooth, and moving the second arresting element onto a tooth flank of the third tooth which faces away from the second tooth;

moving the second arresting element into an engagement position between the third tooth and the fourth tooth, wherein the second arresting element performs a shearing movement against the tooth flank of the third tooth which faces away from the second tooth, passively or actively moving the first arresting element against a tooth flank of the second tooth which faces the first tooth, and moving the third arresting element onto a tooth flank of the fifth tooth which faces away from the fourth tooth; and moving the third arresting element into an engagement position between the fifth tooth and the sixth tooth, wherein the third arresting element performs a shearing movement against the tooth flank of the fifth tooth which faces away from the fourth tooth, passively or actively moving the second arresting element against a tooth flank of the fourth tooth which faces the third tooth and moving the first arresting element into a standby position.

15. The rotor arresting device as claimed in claim 1, wherein the first arresting module has a plurality of first arresting elements, wherein the second arresting module has a plurality of second arresting elements.

16. The rotor arresting device as claimed in claim 1, wherein at least one arresting module of the first and second arresting modules is configured to be arranged on at least one of a support frame, a base support, a stator support, a machine support, or a bearing device of a main shaft.

17. The rotor arresting device as claimed in claim 1, wherein the toothed disk is configured to be arranged on at least one of an input side of a transmission or an output side of the transmission.

* * * * *